United States Patent [19]
Ueno et al.

[11] 3,985,107
[45] Oct. 12, 1976

[54] COMBUSTIBLE MIXTURE SUPPLY SYSTEM

[75] Inventors: Zene Ueno, Tokyo; Tadahiko Nagaoka, Tokorozawa, both of Japan

[73] Assignee: Nissan Motor Co., Ltd., Yokohama, Japan

[22] Filed: Dec. 14, 1973

[21] Appl. No.: 424,744

[30] Foreign Application Priority Data
Dec. 15, 1972   Japan .................... 47-144140[U]

[52] U.S. Cl. .................. 123/1 A; 123/DIG. 12; 123/3; 123/119 E
[51] Int. Cl.² ........................................ F02B 43/08
[58] Field of Search ......... 123/1 A, DIG. 12, 198 A, 123/198 E, 141, 3, 119 D, 119 E, 119 DB; 60/39.46

[56] References Cited
UNITED STATES PATENTS

| | | | |
|---|---|---|---|
| 1,108,608 | 8/1914 | Nedoma | 123/119 E |
| 2,673,069 | 3/1954 | Carpenter | 123/119 E |
| 2,775,961 | 1/1957 | Petre | 123/119 E |
| 2,862,482 | 12/1958 | Hart | 123/119 E X |
| 2,915,030 | 12/1959 | Perner | 123/119 E X |
| 3,395,899 | 8/1968 | Kopa | 123/141 X |
| 3,564,580 | 2/1971 | Cinque | 123/119 D |

*Primary Examiner*—Charles J. Myhre
*Assistant Examiner*—Ira S. Lazarus

[57] ABSTRACT

Decomposed hydrogen peroxide is fed into an engine intake passageway in addition to fuel and air to provide a combustible mixture containing a low concentration of nitrogen.

2 Claims, 1 Drawing Figure

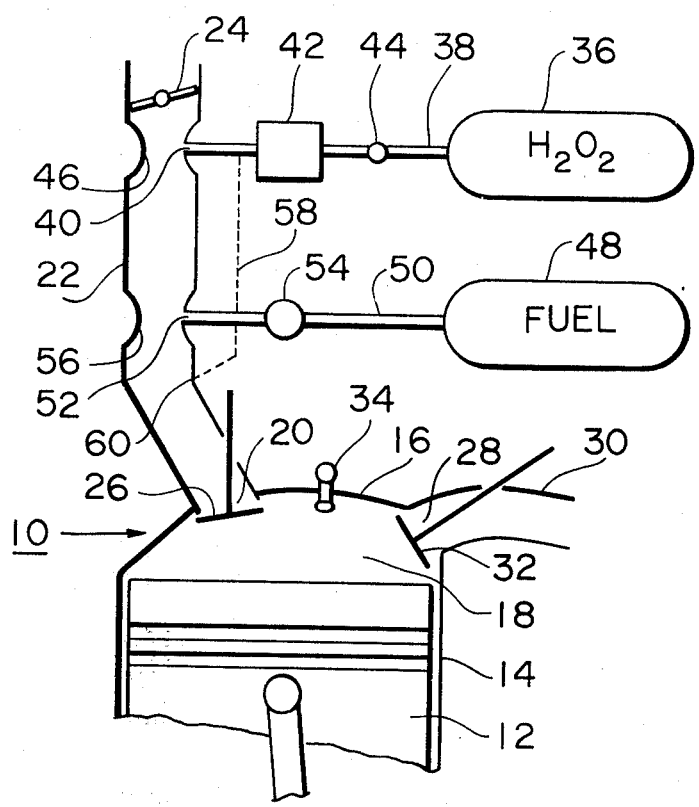

COMBUSTIBLE MIXTURE SUPPLY SYSTEM

The present invention relates to a oxidizer supply system for an engine which is adapted to minimize the concentration of air pollutants in exhaust gases emitted by the engine.

It is well known in the art that noxious nitrogen oxides (NOx) are produced by combustion of a conventional combustible mixture in a combustion chamber of a combustion engine which pollute the atmosphere. This is because air is employed as an oxidizer for combustion of fuel, and nitrogen oxides are formed by combination of oxygen with nitrogen which occupies about 78 per cent by volume of atmospheric air during combustion of fuel in an engine combustion chamber. Thus, a reduction in the concentration of nitrogen in the combustible mixture is a solution to the problem of minimizing the production of nitrogen oxides.

It is therefore an object of the invention to provide a oxidizer supply system to fill an engine combustion chamber with a combustible mixture containing a low concentration of nitrogen.

It is a further object of the invention to provide a oxidizer supply system to fill an engine combustion chamber with a combustible mixture which burns at a low temperature.

It is a still further object of the invention to provide a oxidizer supply system to supply a combustible mixture containing a high concentration of oxygen.

These and other objects and advantages of the invention will become more apparent from the following detailed description when taken in connection with the accompanying drawing showing a schematic cross sectional view of a preferred embodiment of a oxidizer supply system according to the invention connected to a combustion engine.

Referring now to the drawing, an engine 10 includes, as customary, a reciprocating piston 12, a cylinder 14 accommodating the piston 12 therein and having a cylinder head 16, a combustion chamber 18 formed in the cylinder head 16, an intake port 20 formed through the cylinder head 16 and opening into the combustion chamber 18, a combustible mixture intake passageway 22 communicating with the intake port 20 and vented to the open air through an engine air cleaner (not shown), a throttle valve 24 movably mounted in the intake passageway 22, an intake valve 26 disposed in the intake port 20, an exhaust port 28 formed through the cylinder head 16 and opening into the combustion chamber 18, an exhaust passageway 30 communicating with the exhaust port 28 and vented to the open air through a silencer (not shown), an exhaust valve 32 disposed in the exhaust port 28, and a spark plug 34 disposed in the combustion chamber 18. The throttle valve 24 is manually operable to control the flow of air passing through the intake passageway 22 in accordance with the torque or load demands of the engine 10.

The engine 10 is provided with a source 36 of an oxidizer, here described as being a compound of oxygen such as hydrogen peroxide ($H_2O_2$). The hydrogen peroxide source 36 communicates with the intake passageway 22 through a conduit 38. The conduit 38 opens into the intake passageway 22 through a port 40 downstream of the throttle valve 24. A decomposer such as a catalyst chamber 42 having a catalyst therein is disposed in the conduit 38. A flow control valve 44 is disposed in the conduit 38 between the catalyst chamber 42 and the hydrogen peroxide source 36. The flow control valve 44 is manually or automatically operable to control the flow of hydrogen peroxide passing therethrough in accordance with the torque or load demands of the engine 10. The catalyst in the catalyst chamber 42 decomposes hydrogen peroxide supplied through the control valve 44 into water vapour and oxygen ($H_2O + \frac{1}{2}O_2$). The water vapor and oxygen are fed into the intake passageway 22 and mixed with air passing therethrough. Silver, copper, etc. may be employed as the catalyst. A first venturi section 46 is formed in the intake passageway 22 into which the port 40 opens. The flow of air passing through the venturi section 46 produces a vacuum therein to draw water vapour and oxygen from the conduit 38 into the venturi 46. The venturi section 46 also serves to assist or promote mixing of water vapour and oxygen with air passing therethrough. A swirler or vane assembly may be provided in the intake passageway 22 or the venturi section 46 for a similar purpose.

The engine 10 also includes a source 48 of fuel, which communicates with the intake passageway 22 through a conduit 50 and a fuel port 52 downstream of the port 40. A pump 54 is disposed in the conduit 50 which supplies or injects fuel from the fuel source 48 into the intake passageway 22 in accordance with the torque or load demands of the engine 10. The pump 54 is actuated to feed fuel into the intake passageway 22 in synchronism with the intake stroke of the piston 12 so that fuel is fed into the mixture of air, water vapour and oxygen passing through the intake passageway 22. The pump 54 may be driven by the engine 10 or any other suitable means such as an electric motor. A second venturi section 56 is formed in the intake passageway 22 into which the fuel port 52 opens. The venturi section 56 serves to assist or promote mixing of fuel with the mixture of air, water vapour and oxygen passing therethrough. A swirler or vane assembly may be provided in the intake passageway 22 or the venturi 56 for a similar purpose. The flow of the mixture passing through the venturi 56 produces a vacuum therein to draw fuel from the conduit 50 into the venturi 56. A branch passageway or conduit 58 may be provided which branches off from the conduit 38 downstream of the catalyst chamber 42 and which communicates with the intake passageway 22 downstream of the fuel port 52 as shown at a point 60 in the drawing. The branch conduit 58 serves to supply additional water vapour and oxygen into the intake passageway 22.

In operation, air is drawn through the air cleaner (not shown) into the intake passageway 22 past of the throttle valve 24 during the intake stroke of the piston 12. Water vapour and oxygen resulting from decomposition of hydrogen peroxide are injected through the conduit 38 and the port 40 from the catalyst chamber 42 into the venturi 46 and mixed with air passing therethrough. The mixture of air, water vapour and oxygen passes through the intake passageway 22 toward the fuel port 52. Fuel is injected through the conduit 50 and the fuel port 52 from the pump 54 into the intake passageway 22 and mixed with the mixture of air, water vapour and oxygen passing therethrough to form a combustible mixture. The combustible mixture is drawn through the intake port 20 into the cylinder 14 and burned in the combustion chamber 18 after being compressed by the piston 12. Since the water vapour and oxygen reduce the concentration of air or nitrogen in the combustible mixture and the water vapour serves to reduce the temperature of combustion of the combustible mixture, production of nitrogen oxides is minimized. Since oxygen is added to increase the concentration of oxygen in the combustible mixture, the combustible mixture is efficiently burned to minimize the production of hydrocarbons (HC) and carbon monoxide (CO).

It will be understood that reduction or elimination of air pollutants in engine exhaust gases is attained by the invention.

Although the invention has been described as being applied to a reciprocating engine, the invention can be applied to other various combustion engines such as rotary engines.

What is claimed is:

1. A combination of an engine having a combustion chamber, an intake passageway providing communication between said combustion chamber and the outside atmosphere, and a source of fuel communicating with said combustion chamber, with an oxidizer supply system comprising a source of hydrogen peroxide and a conduit leading from said source of hydrogen peroxide to said intake passageway, said intake passageway being formed therein with a venturi, said conduit opening into said venturi to cause oxidizer to be drawn thereinto when air passes through said venturi into said combustion chamber, in which said oxidizer supply system further comprises a decomposer disposed in said conduit between said source of hydrogen peroxide and said intake passageway operative to decompose hydrogen perioxide passing therethrough in which said decomposer comprises a catalyst, in which said venturi is formed in said intake passageway upstream of a section of said intake passageway with which said source of fuel communicates, in which said oxidizer supply system further comprises a branch passageway communicating with said conduit downstream of said decomposer and opening into said intake passageway downstream of said section.

2. A combination of an engine having a combustion chamber, an intake passageway providing communication between said combustion chamber and the ouside atmosphere, and a source of fuel communicating with said combustion chamber, with an oxidizer supply system comprising a source of hydrogen peroxide and a conduit leading from said source of hydrogen peroxide to said intake passageway, said intake passageway being formed therein with a venturi, said conduit opening into said venturi to cause oxidizer to be drawn thereinto when air passes through said venturi into said combustion chamber in which said oxidizer supply system further comprises a decomposer disposed in said conduit between said source of hydrogen peroxide and said intake passageway operative to decompose hydrogen peroxide passing therethrough, and a flow control valve disposed in said conduit between said source of hydrogen peroxide and said decomposer, in which said decomposer comprises a catalyst, in which said venturi is formed in said intake passageway upstream of a section of said intake passageway with which said source of fuel communicates, in which said oxidizer supply system further comprises a branch passageway communicating with said conduit downstream of said decomposer and opening into said intake passageway downstream of said section.

* * * * *